United States Patent Office 3,726,896
Patented Apr. 10, 1973

3,726,896
1-BENZYL-3(2,3-DIHYDROXYPROPOXY) INDAZOLE
Jose Amato, Marta Stamburgo, and Edmundo Fischer, Buenos Aires, Argentina, assignors to Szabo Hnos. Kessler & Cia, Buenos Aires, Argentina
No Drawing. Filed May 6, 1970, Ser. No. 35,294
Int. Cl. C07d 49/18
U.S. Cl. 260—310 C                1 Claim

ABSTRACT OF THE DISCLOSURE 1 benzyl 3 (alpha hydroxy propoxy) indazole, compounds and compositions including 1 benzyl 3 (beta, alpha dihydroxy propoxy) indazole and the metallic salts of their corresponding hemisuccinates in the primary or secondary form; utility of the compounds includes analgesics, and anti-inflammatories.

BACKGROUND OF THE INVENTION

The invention relates to a method of preparing certain derivatives of 1 benzyl 3 hydroxy indazole with a hydroxylated ether side chain, there are accordingly two derivatives, namely 3-hydroxy-propoxy and 3(beta, alpha dihydroxy propoxy) 1 benzyl indazole, available by means of our method hereinafter described.

These compounds have been evaluated in testing using mice and rabbits and are characterized by good analgesic and antiinflammatory properties, and by relatively low toxicity.

The studies concerning their analgesic action was conducted with the Wolfe and McDonald method modified (M. Stamburgo and M. Martinez, Semana Medica 113, 556, 1958) which showed a marked effect and the toxicity test revealed a high therapeutic index, as only a dose 100 times higher than the therapeutic one produced in the rabbit by intravenous route, brief shock, and the animal recovered in a few minutes. By subcutaneous route this dose did not affect the animals. In the foregoing assays the sodium salt of hemisuccinate was used, however, other metallic salts will suffice.

SUMMARY

The method of preparation consists of treating the sodium salt of 1-benzyl-3-(3-hydroxy)indazole with the corresponding 1 halo-3 hydroxy (or 2-3 dihydroxy) propane and refluxing in an inert solvent such as benzene, toluene or xylene (Method B). The method of preparation may also be carried out by the preparation of the sodium salt "in situ," and adding to a solution of precalculated amount of sodium hydroxide in alcohol, the 1-benzyl-3 indazole (Method A), dissolution of the salt so prepared and adding the corresponding halohydroxy compound. The two methods are interchangeable for either one of the compounds.

The compounds here described and claimed are insoluble in water, they can be solubilized by esterification and subsequent salification with succinic acid or with its reactive derivatives such as the anhydride. The sodium salt of the hemisuccinate is water-soluble. Solutions prepared in this way can be lyophilized.

The following examples which are not to be considered as limiting, illustrate the methods of preparation with regard to the aforementioned compounds.

METHOD A

Example 1

In a solution of 10 grams sodium hydroxide dissolved in 250 milliliters of 96% alcohol accomplished by mechanical stirring at room temperature, there is added 56 grams of 1-benzyl-3-indazolone at about 70° C. while mechanical stirring is carried out until dissolution occurs.

Once all of the 1-benzyl-3-indazolone is dissolved, 28 grams of 1-chloro-3-hydroxypropane are added and the resulting composition is refluxed for about 3 hours at about 80° C.

The resulting suspension is then filtered, the alcohol removed from the filtrate by vacuum distillation and the resulting residue allowed to cool. The residue which is in the form of oil is mixed with 250 milliliters of water. The oil crystallizes after mechanical stirring for about 12 to 15 hours; it is then filtered, washed with water and dried in vacuo.

The yield of the impure product corresponds to 60 grams (80%), having a melting point of about 102–5° C. A white product having a melting point of 114–115° C. is obtained by recrystallization of the impure product. Recrystallization is carried out in benzene after purifying the solution with activated charcoal. The resulting product is insoluble in water but soluble in alcohol.

METHOD B

Example 2

A suspension of 61.5 grams of fine powdered sodium salt of 1-benzyl-3-indazolone (easily prepared from the equivalent quantity of $CH_3-ON_a-CH_3OH$ solution of 1-benzyl-3-indazolone in methyl alcohol by elimination of methyl alcohol in vacuo) is stirred vigorously and refluxed with 28 grams of 1-chloro-3-hydroxypropane in an inert solvent such as 250 milliliters of anhydrous xylol. The stirring and refluxing should continue for approximately 5 hours after which time the composition is filtered in water, preferably cold water and the product is then crystallized and filtered. The yield is approximately 55 grams having a purity of 73% and a melting point of 114° C.

Example 3

The 1-benzyl-3-(3-hydroxy propoxy) indazole can also be prepared by the following method.

22.4 grams of 1-benzyl-3-indazolone are dissolved in a solution of 2.3 grams sodium in 200 milliliters of n-butyl alcohol, the aforesaid dissolution occurs by heating and refluxing for a period of approximately one half hour, after which time 20 grams of 3-bromo-1-propanol is added. Refluxing is then continued again for a period of approximately two hours, after which the alcohol is removed by vacuum distillation and the resulting residue dissolved in an inert solvent such as benzene, preferably preheated. The residue is then filtered and crystallized. A white crystalline product having a melting point of 131° C. is obtained; the yield being 20 grams which is the equivalent of 70%.

Example 4

Preparation of indazole, 1-benzyl-3-(2,3-dihydroxy) propoxy dihemisuccinate.

60 grams of 1-benzyl-3-(2,3-dihydroxy propoxy) indazole is added to a solution of 90 grams of succinic anhydride which has been previously dissolved in 200 milliliters of pyridine; the mixture is heated to about 75° C. for approximately 3 hours and then cooled. 400 milliliters of water is then added to the resultant composition, the mixture thereof is then added to the resultant composition, the mixture thereof is then stirred for about a half-hour and maintained at a temperature of approximately 15° C. Concentrated hydrochloric acid is then added until a pH of 2.5 is reached (Merck Paper Indicator). The foregoing pH adjustment requires approximately 250 milliliters of hydrochloric acid.

After the aforementioned composition is allowed to come to equilibrium, decantation is carried out with two additional washings using 250 milliliters of water, the remaining oil is then solubilized in 250 milliliters of water by the addition of 20% sodium carbonate (by weight), whereby the pH is brought up to approximately 5.5 to 6.0; 2 grams of activated charcoal are added and the composition is then filtered.

The filtrate is precipitated with concentrated hydrochloric acid, washed twice with water whereupon 200 milliliters of water are added thereto and the resultant composition is extracted with ether.

The ether extract is then dried with magnesium sulphate, the ether removed in vacuo and the remaining material weighed. A calculated amount of diluted sodium hydroxide is then added in order to bring the pH to 7.5, additional activated charcoal is added and the resultant composition is filtered once again. Lyophilization of the foregoing solution gives a product apt for therapeutic use.

We wish it to be understood that we do not desire to be limited to the exact details described for obvious modifications will occur to a person skilled in the art.

Having thus described the invention, what we claim as new and desired to be secured by Letters Patent, is as follows:

1. A compound of the formula

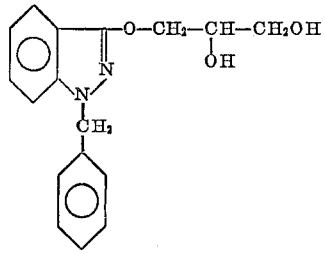

designated 1-benzyl-3(2,3-dihydroxy propoxy) indazole.

References Cited

UNITED STATES PATENTS

| | | | |
|---|---|---|---|
| 3,318,905 | 5/1967 | Palazzo | 260—310 C |
| 3,470,194 | 9/1969 | Palazzo | 260—310 C |

FOREIGN PATENTS

| | | | |
|---|---|---|---|
| 1,152,885 | 5/1969 | Great Britain | 260—310 C |
| 1,530,097 | 3/1968 | France | 260—310 C |

OTHER REFERENCES

Palazzo et al.: Chem. Abst., vol. 72, No. 90366n (1970).

Baiocchi et al.: Chem. Abst., vol. 72, No. 90367p (1970).

Chemical Abstracts, vol. 72, Subject Index (E-O), p. 1446S (June 30, 1970)-(1971).

Chemical Abstracts, vol. 72, Subject Index (P-Z), p. 3112S (June 30, 1970)-(1971).

Palazzo et al.: Rend. Accad. Naz. 40 (Quaranta) 1968 (4), 18-19, 255-68. Reprint of article obtained.

Baiocchi et al.: Rend. Accad. Naz. 40 (Quaranta) 1968 (4), 18-19, 269-80. Reprint of article obtained Schmutz et al.: Helv. Chim. Acta, vol. 47, pp. 1986-96 (1964).

NATALIE TROUSOF, Primary Examiner

U.S. Cl. X.R.

424—273